J. P. SUMMERS.
Rock-Drills for Boring and Drilling Wells.
No. 8,390. Reissued Aug. 27, 1878.
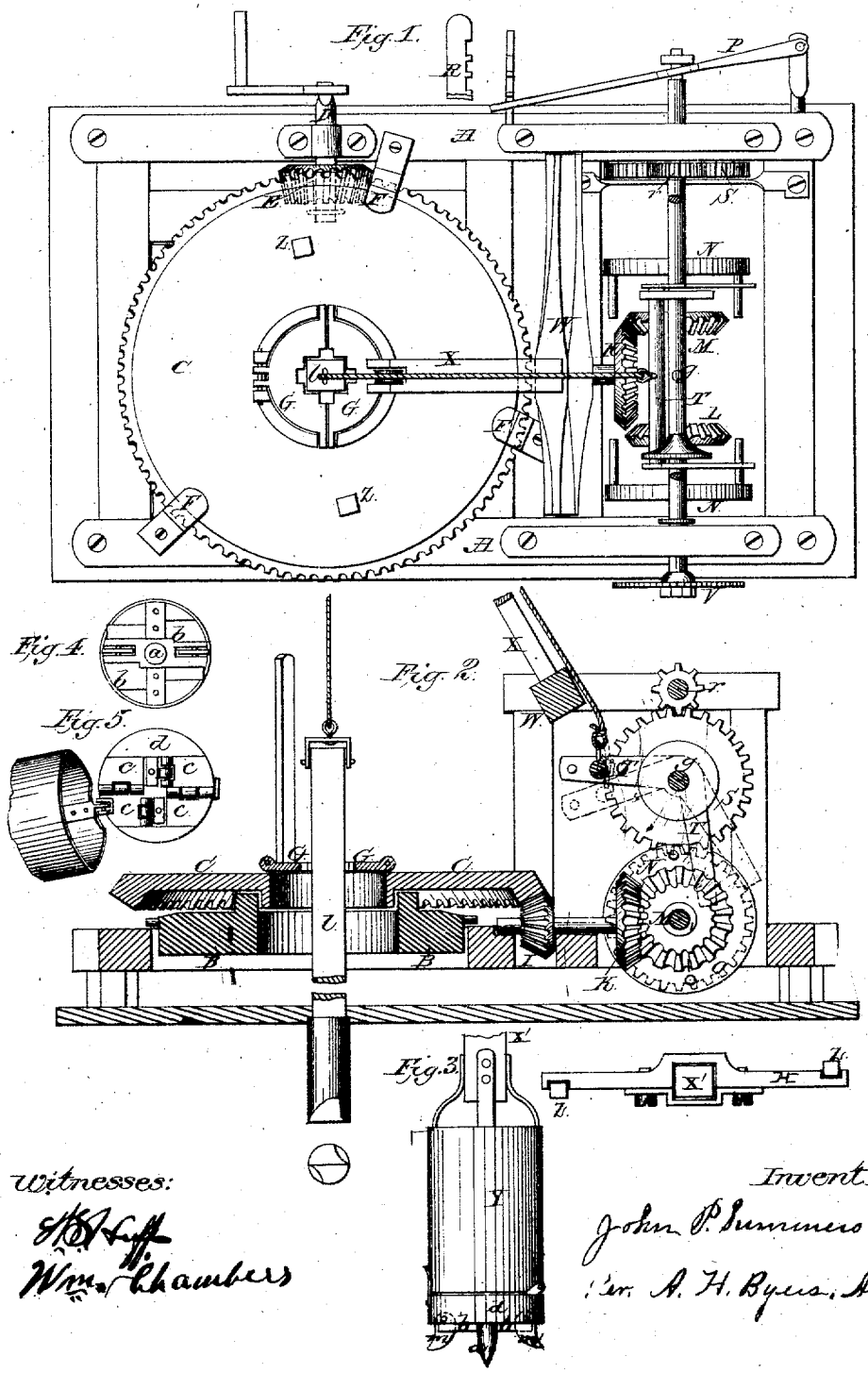
Witnesses:
Wm. Chambers
Inventor:
John P. Summers
Per A. H. Byers, Atty

BEST AVAILABLE COPY

UNITED STATES PATENT OFFICE.

JOHN P. SUMMERS, OF TIFFIN, OHIO.

IMPROVEMENT IN ROCK-DRILLS FOR BORING AND DRILLING WELLS.

Specification forming part of Letters Patent No. 94,923, dated September 14, 1869; Reissue No. 8,390, dated August 27, 1878; application filed August 1, 1878.

*To all whom it may concern:*

Be it known that I, JOHN P. SUMMERS, of Tiffin, in the county of Seneca and State of Ohio, have invented a new and useful Improvement in Rock-Drill and Well-Boring Machines, which improvement is fully set forth in the following specification, reference being had to the accompanying drawings.

The nature of my invention consists in the arrangement of certain devices so as to form a machine for drilling and boring wells and piping, as will hereinafter be fully set forth and described.

Figure 1 is a plan view of my machine. Fig. 2 is a section view of the same. Fig. 3 is a side view of the piping-auger. Fig. 4 is a bottom view of the same. Fig. 5 is a plan view of the bottom, showing arrangement of the valves. Fig. 6 is a plan view of the arm by means of which the auger is operated.

A represents the frame of my machine, which may be of any size and shape desired. At one end of this frame is placed the bed-piece B, upon which the master-wheel C rests and revolves. In the center of this bed there is a large circular opening made, through which the augers and drills are lowered and raised, and is provided with a collar upon its rim, so as to receive the flange upon the bottom of the master-wheel C. Upon one side of the frame A is placed a short shaft, D, to which the motive power is applied for running or operating the machine. To the inner end of this shaft there is attached a small cog-wheel, E, which gears in and communicates the motion to the master-wheel C. This wheel C is placed upon the bed-piece B in such a manner as to allow it to revolve freely around for the purpose of operating the augers and drills, and also giving motion to the other parts of the machine. In order to retain this wheel in its proper position, it is cast with a circular flange upon its under side, which runs around the opening in its center and fits in the neck upon the bed-piece B, and secured to the frame are a number of clasps, F, to hold it down. Through its center a large circular opening is made, which is provided with two semicircular doors, G, pivoted or bolted on, so that they can be opened or closed at pleasure. A square aperture or opening is made through them, so that when closed they will grasp the shaft X′ connected to the auger, and as the wheel revolves the auger will thus be made to bore. As this shaft will consist of a great many pieces, which will have to be secured firmly together by bolts passing through, and then have nuts screwed upon their ends, upon each side of this opening there is a small notch, so as to allow these bolt heads and nuts to pass. Rising from the top of this wheel there are two upright posts or pillars, Z Z, placed upon opposite sides of the opening, which catch the ends of the arm H upon the top of the auger-shaft, and thus assist in turning and operating it. Upon the lower rim of this master-wheel are cogs, for the purpose of receiving motion from wheel E, and then in turn imparting it to wheel I. Attached to the same shaft as the wheel I, upon the opposite end, is placed the miter-wheel K, which gears in two other wheels, L and M, for the purpose of lowering and raising the drills and augers. Upon the same shaft, which extends from one side of the frame out through on the other, are placed two disks, N, the cog-wheel O, as shown by dotted lines in Fig. 2, and upon its outer end the lever P. By means of this lever the wheels L and M are thrown in and out of gear.

Extending out from the side of the frame there is a metal plate, which has three notches cut in its upper edge, for the purpose of holding the lever at any desired place.

When swung far enough around so as to catch in the notch nearest to the frame, the wheel M is thrown into gear with the wheel K, so as to elevate or raise the drills from the hole. When in the middle one, it throws the drills entirely out of gear; but when in the outer notch, the wheel L is thrown into gear, so as to lower the drills. Placed immediately above the cog-wheel O there is a second one of the same size, which gears with it. Upon the same shaft as the wheel S there is placed a tilting frame, T, and a reel, upon which the rope or chain connected to the drills is wound. This tilting frame consists of two pieces, bent in the shape of a square, and connected by a rod, which has a loop or staple attached to it. The other two ends hang down, so that the long arms or projections upon the two disks M will give it a reciprocating motion.

Extending across the frame there is a third shaft, provided with a small cog-wheel, *r*, so as to mesh in with the one S, upon the outer end of which is placed a ratchet, V, which will be controlled by a pawl, so as to hold the auger or drill when elevated. Pivoted between two parts of the frame there is a cross-piece, W, to which is attached a derrick-pole, X, provided at its upper end with a pulley, over which the rope or chain passes. This pole X can be raised or lowered to any angle, and is used to raise and lower the drills or augers.

Letter Y, Fig. 3, is the auger I use in boring wells. This auger consists of a large cylinder, having a movable bottom secured to one side of the cylinder by a hinge and to the other by a hook or pin. In this bottom are placed the drills, as seen in Fig. 4. Across the bottom of this cylinder are two bars, placed at right angles with each other, through which the auger-point *a* is placed. Extending down below the edge of the bottom are two auger-blades, *b*, which not only cut the earth loose, but convey it upward into the cylinder. Upon the top of this movable bottom are two double valves, *c*, which are formed like small trap-doors, two being pivoted together. As the earth is conveyed upward by these blades *b* these doors or valves will be forced open, so as to let it pass upward, but will remain closed as soon as the cylinder is lifted upward by the weight of the earth.

The shaft which is connected to this cylinder can be lengthened at pleasure by the addition of other pieces, and is provided with an arm, H, as seen in Fig. 6, at its top. This arm consists of a long rod, indented in the middle, so as to receive the shaft, and has a metal clasp to secure them firmly together. Near each end, but upon opposite sides, are slots cut in, so as to receive the projections upon the master-wheel C. Clasping the top of this shaft and of the drills there is a metal brace or clasp, in the top of which is a small hook or staple, fastened in such a manner that the shaft or drills can be turned without twisting the rope or chain.

The two small bits *m* are used for boring in quicksand, and will adjust themselves.

The operation of my machine is as follows: When I desire to bore a well I use the auger Y. The machine is placed over the spot where it is intended to sink the well, so that the opening in the master-wheel C will come directly over it. The doors G are then opened and the auger inserted. The lever P is made to catch in the middle notch in the serrated plate R, so as to throw all the rest of the machinery out of gear until it is desired to use it. The motive power is then applied to the shaft D, through which the motion is communicated to the master-wheel C. As this wheel revolves the two projections upon its face catch the arm H, causing the auger to revolve also. As soon as the cylinder has been filled with earth the lever P is moved over, so as to catch in the notch nearest to the frame, so as to throw the wheel M in gear with the wheel K. As the rope or chain to which the auger is attached passes over the pulley on the end of the derrick X, and then is secured to the reel *g*, as soon as this is set to revolving the auger is raised from the hole. The movable bottom *d* is then unhooked and allowed to swing down and the earth allowed to drop out, when it is again ready to bore. The lever is then moved outward, so as to catch in the last notch, which brings the wheel L into gear, which causes the reel to unwind and lower the auger into the hole again. As this auger is provided with two movable drills or cutters, *m*, the size of the hole can be varied at pleasure.

When it is desired to use the machine for drilling instead of boring, the auger is removed and the drill *l* attached to the end of the chain or rope, while the other one is removed from the reel and attached to the hook in the tilting frame T. The doors G are closed, so as to serve as a guide to the drill and impart to it a rotary motion. As soon as the machine is set in motion the long arms upon the two disks N in revolving engage with the tilting frame, and in moving it out and upward raise the drill from the rock, and as the arms allow it to slip back the drill falls with all its weight upon the stone.

I claim as my invention—

1. The miter-wheel C, provided with the hinged doors G G, substantially as and for the purpose specified.

2. The miter-wheel C, uprights Z Z, and cross-arm H, substantially as and for the purpose set forth.

3. The auger Y, provided with a movable bit or bottom, *d*, secured to the cylinder *y* by means of a hinge on one side and a hook or pin on the other.

4. The auger Y, shaft X′, cross-arm H, wheel C, and uprights Z Z.

5. The auger Y, with movable bottom *d*, bits *m m*, and valves *b b*, substantially as and for the purpose set forth.

6. The combination of the lever P and shaft with wheels L and M and the wheel K, all operating substantially as and for the purposes set forth.

7. The arrangement of the wheels L, M, I, K, C, and E, substantially as and for the purposes set forth.

8. The arrangement of the wheels O, S, and *r*, reel *g*, and derrick X, when combined for the purpose set forth.

JOHN P. SUMMERS.

Witnesses:

GEO. D. LOOMIS,
C. B. ALLEN.